United States Patent Office 3,583,955
Patented June 8, 1971

3,583,955
SATURATED LINEAR POLYMERS HAVING PENDANT FUNCTIONALITY
Donald F. Holicky, Parma, Kenneth G. Hahn, Brookpark, and Robert C. Gasman, Parma, Ohio, assignors to SMC Corporation, Cleveland, Ohio
No Drawing. Filed Feb. 11, 1969, Ser. No. 798,458
Int. Cl. C08f 15/40, 27/12
U.S. Cl. 260—78.4                          9 Claims

ABSTRACT OF THE DISCLOSURE

A class of polymers comprising an ester-free backbone having pendant therefrom through ester linkage a plurality of ethylenically unsaturated groups which are polymerizable with vinyl monomers for thermosetting purposes under the influence of free radical catalysis is described along with processes for preparing the polymers.

Polymers falling within the scope of this invention are advantageous in that, when thermoset, they produce shaped bodies or objects which have controlled physical properties (e.g., mechanical strength and flexibility) and which also have increased solvent, acid and alkali resistance over shaped objects prepared from conventional polyester polymers.

BACKGROUND OF INVENTION

Polyester polymers or resins constitute one of the most widely used thermoset polymers. Such resins are the reaction products of unsaturated polycarboxylic acids and polyols and the linear polymer chains are formed through ester linkage contained in the linear backbone which has unsaturated functionality. The polyester resins are readily thermoset by polymerization with a copolymerizable monomer which cross-links the linear polyester backbone at its unsaturation sites, which are present in the backbone, to form rigid products. Polyester resins, when thermoset, are often disadvantageous in that the ester linkages in the backbone are subject to hydrolysis and the backbone is sometimes broken, opening the polymer grid to additional chemical attack.

The polymers of the present invention are free of ester linkages in the backbone which is saturated. The unsaturation through which cross-linking is accomplished to obtain thermoset resins is external to the backbone and is present on pendant groups which are attached to the unsaturated backbone through ester (e.g., acyl) linkage.

The backbone is an addition polymer, thus making possible the production of linear resins having significantly higher molecular weight (e.g., a molecular weight ranging from 10,000 to 225,000) than the molecular weight of conventional polyester resins which usually have maximum molecular weights of about 5000. Thermoset products prepared from polymers falling within the scope of this invention have increased physical strength and increased solvent, acid, and alkali resistance over thermoset products prepared from conventional polyester resins. Additionally, thermoset objects prepared from polymers falling within the class of this invention have better dimensional stability, that is, they shrink to a lesser extent than cured products prepared from conventional polyester resins which are known to shrink significantly during cure.

SUMMARY OF THE INVENTION

The present invention provides a novel class of linear polymers consisting essentially of an ester-free, saturated backbone having pendant therefrom through ester linkage a plurality of unsaturated groups polymerizable with vinyl monomer for thermosetting purposes. The polymers are advantageous in that their properties can be controlled and/or altered by regulating the frequency, length, and degree of unsaturation of the pendant unsaturated groups, thereby permitting the production of thermoset molded products having a wide diversity of improved physical properties.

By way of example, where the backbone contains a relatively large plurality of pendant ethylenically unsaturated groups, the resultant linear polymer when crosslinked, will produce highly rigid products. One the other hand, when the backbone contains a smaller number of pendant groups having unsaturation, the polymer will tend to be flexible and exhibit great flexural strength. The polymers are further advantageous in that they produce molded products which have significantly greater tensile strength and unusually high resistance to chemical attack by solvent, acids, and alkalies.

The linear saturated polymer backbone is formed from any of a wide variety of ethylenically unsaturated monomers. However, one of the monomers must have oxirane, hydroxyl or carboxyl substitution in order to provide a plurality of reaction sites for attaching the pendant unsaturated groups external to the polymer backbone.

Although the backbone, prior to the addition of the pendant unsaturated groups alternatively contains external oxirane, hydroxyl or carboxyl groups, polymer backbones having oxirane or hydroxyl substitution have been found to be particularly advantageous in providing stable linear polymer products (e.g., products which do not gel on storage). Where the backbone, prior to the addition of pendant unsaturated groups, has a plurality of carboxyl groups, the polymer will sometimes gel during the addition of hydroxyl substituted ethylenically unsaturated groups.

Monomers other than those containing oxirane, hydroxyl or carboxyl groups which can form the backbone of the polymers of this invention are those selected from the class consisting of ethylenically unsaturated substituted and unsubstituted hydrocarbons, ethylenically unsaturated carboxylic acid esters of organic and inorganic acids, ethylenically unsaturated organic halides, and ethylenically unsaturated nitriles.

Ethylenically unsaturated hydrocarbons include aliphatic hydrocarbons, for example, ethylene, propylene, butylene, amylene, hexylene, heptylene, octylene, and the like. Also included among the ethylenically unsaturated hydrocarbons are aromatic hydrocarbons, particularly vinylidene hydrocarbons including styrene, α-methyl styrene, vinyl toluene, divinyl benzene as well as their halo-substituted counterparts.

Ethylenically unsaturated carboxylic acid esters of organic and inorganic acids include esters of unsaturated carboxylic acids such as alkyl acrylates including methyl acrylate, ethyl acrylate, propyl acrylate, butyl acrylate, pentyl acrylate, ethyl hexyl acrylate and the corresponding methacrylates as well as saturated carboxylic acid esters of ethylenically unsaturated alcohols, for example, vinyl acetate, vinyl butyrate and their halo-substituted counterparts, and the like.

Ethylenically unsaturated organic halides include vinyl halides and halo-substituted aromatic hydrocarbons, for example, chlorostyrene, chloromethyl styrene, and the like.

Ethylenically unsaturated nitriles include, for example, acrylonitrile, crotonitrile, methacrylonitrile, and the like.

Polymers falling within the classes of this invention contain at least one and sometimes can contain several of the monomers falling within the above-mentioned classes. Also, at least one monomer of the class consisting of an ethylenically unsaturated alcohol such as allyl, crotyl, α-methyl allyl or β-methyl crotyl alcohols, α,β-ethylenically unsaturated carboxylic acid, a hydroxy lower alkyl ester of an unsaturated carboxylic acid or an ethylenically unsaturated glycidyl ester or ether are essential in the backbone in order to provide a linear polymer, free of ethylenic unsaturation but containing pendant carboxyl, hydroxyl, or oxirane functional groups.

Hydroxyalkyl esters of ethylenically unsaturated carboxylic acids are advantageously hydroxy lower alkyl esters containing from about 2 to about 5 carbon atoms in the alkyl group. Although hydroxyalkyl esters containing more than 5 carbon atoms in the alkyl group can be employed, there is usually no advantage and the use of such esters can be economically disadvantageous.

Examples of hydroxyalkyl esters of ethylenically unsaturated carboxylic acids include hydroxyalkyl esters of ethylenically unsaturated mono- and dicarboxylic acids.

Examples of esters of monocarboxylic acids include hydroxyalkyl esters of acrylic, crotonic, isocrotonic, vinyl acetic, methacrylic, tiglic, angelic, senecioic, teracrylic, hypogeic, oleic, elaidic, erucic, brassidic, and behenic acids. Of these, hydroxyethyl, hydroxypropyl, and hydroxybutyl esters of acrylic, vinyl acetic, and methacrylic acids are preferred for economic reasons.

Examples of hydroxyalkyl esters of unsaturated dicarboxylic acids include esters of fumaric, maleic, glutaconic, citraconic, itaconic, ethidene malonic, mesaconic, allylmalonic, propylidene malonic, hydromuconic, pyrocinconic, allyl succinic carbocaprolactonic, and teraconic acids. Of these, hydroxyethyl, hydroxypropyl and hydroxybutyl diesters of fumaric, maleic, glutaconic, and itaconic acids are preferred for economic reasons.

Hydroxy lower alkyl esters which have been found to provide particularly advantageous polymers are hydroxyethylacrylate, hydroxypropylacrylate, hydroxyethylmethacrylate, hydroxypropylmethacrylate, dihydroxyethyl fumarate, dihydroxypropyl fumarate, dihydroxyethyl maleate and dihydroxypropyl maleate esters.

As previously noted, the polymers of this invention can also contain an oxirane pendant from the backbone In this instance, a glycidyl compound is employed in lieu of the hydroxyalkyl esters of ethylenically unsaturated carboxylic acids or α,β-ethylenically unsaturated carboxylic acids. Examples of such glycidyl compounds include glycidyl acrylate, glycidyl methacrylate, allyl glycidyl ether, and monoglycidyl maleate.

The polymers of this invention can also contain an α,β-ethylenically unsaturated carboxylic acid in the backbone in place of the hydroxy lower alkyl ester of an ethylenically unsaturated carboxylic acid. Suitable acids are unsaturated mono- and dicarboxylic acids.

Examples of the α,β-ethylenically unsaturated monocarboxylic acids include acrylic, crotonic, isocrotonic, vinyl acetic, methacrylic, tiglic, angelic, senecioic, teracrylic, hypogeic, oleic, elaidic, erucic, brassidic, and behenic. Of these, acrylic, vinyl acetic, and methacrylic are preferred for economic reasons.

Examples of α,β-ethylenically unsaturated dicarboxylic acids include fumaric, maleic, glutaconic, citraconic, itaconic, ethidene malonic, mesaconic, allyl malonic, propylidene malonic, hydromuconic, pyrocinconic, allyl succinic, carbocaprolactonic, teraconic acids. Of these fumaric, maleic, glutaconic, and itaconic acids are preferred for economic reasons.

The nature of the plurality of ethylenically unsaturated groups which are pendant from the backbone is dependent upon the kind of functional monomer employed in the backbone and, therefore the pendant functionality of the backbone prior to the pendancy of the ethylenically unsaturated groups. Thus, for example, where the backbone initially contains a hydroxyl or oxirane group, the plurality of unsaturated groups will comprise α,β-ethylenically unsaturated carboxylic acid residues attached to the backbone through ester (or acyl) linkage. On the other hand, where the backbone initially contains pendant carboxylic acid groups, the plurality of pendant groups will consist of ethylenically unsaturated compounds which contain prior to attachment oxirane or hydroxyl substituents. Examples of oxirane-containing ethylenically unsaturated compounds are the glycidyl esters and ethers hereinbefore described. Examples of the hydroxyl substituted groups are ethylenically unsaturated alcohol groups and hydroxyalkyl esters of α,β-ethylenically unsaturated carboxylic acid radicals corresponding to those compounds hereinbefore described.

Among advantageous polymers are those in which the backbone is saturated and ester-free and comprise the addition polymer of from about 50 to 70 weight percent of a vinyl aromatic hydrocarbon such as, for example, styrene, α-methyl styrene, chloro methyl styrene, vinyl toluene or the like, and from about 30 to about 20 weight percent of a hydroxy lower alkyl ester of an unsaturated carboxylic acid, for example, hydroxyethyl or hydroxypropyl acrylate, hydroxyethyl or hydroxypropyl methacrylate, di(hydroxyethyl) or di(hydroxypropyl) fumarate, or di(hydroxyethyl) or di(hydroxypropyl) maleate. The plurality of pendant unsaturated groups are ethylenically unsaturated carboxylic acid groups or residues which are linked to the backbone through an ester (or acyl) linkage.

Another advantageous polymer is one wherein the backbone is saturated and ester-free and comprises the addition polymer of from about 50 to about 70 weight percent of a vinyl aromatic hydrocarbon as above described, from about 20 to about 10 weight percent of an unsaturated nitrile such as, for example, acrylonitrile or methacrylonitrile and from about 30 to about 20 weight percent of a hydroxy lower alkyl ester of an ethylenically unsaturated carboxylic acid, for example, one of the hydroxyl lower alkyl esters of ethylenically unsaturated carboxylic acids hereinbefore described. The pendant unsaturated groups are ethylenically unsaturated carboxylic acid residues which are attached to the backbone through an acyl or ester linkage.

The foregoing polymers, when reduced and copolymerized with a copolymerizable vinyl monomer, produce shaped objects having the advantageous properties hereinbefore described.

In another embodiment, the backbone of the polymer is saturated and ester-free and consists essentially of the addition polymer of from about 70 to about 80 weight percent of vinyl aromatic hydrocarbon and from about 30 to about 20 weight percent of an α,β-ethylenically unsaturated carboxylic acid, preferably acrylic, vinyl acetic, methacrylic, fumaric, and maleic acids. In such polymers, the pendant unsaturated groups are residues of a hydroxyl substituted lower alkyl ester of ethylenically unsaturated carboxylic acid groups or residues which are linked to the backbone through acyl or ester linkages.

In still another embodiment, the backbone is saturated and ester-free and consists essentially of the addition polymer of from about 50 to about 70 weight percent of a vinyl aromatic hydrocarbon and from about 20 to about 10 weight percent of a vinyl or vinylidene halide, preferably vinyl or vinylidene chloride and from about 30 to 20 weight percent of a hydroxy substituted lower alkyl ester of an α,β-ethylenically unsaturated carboxylic acid. In these polymers, the pendant unsaturated groups are ethylenically unsaturated carboxylic acid groups or residues which are linked to the linear backbone through ester or acyl linkage. These polymers also, when cross-linked by copolymerization with vinyl monomer, provide shaped objects and thermoset products having the superior properties hereinbefore described.

The present invention provides a novel process for preparing the polymers of this invention which comprises the steps of:

(A) Forming a reaction mixture consisting essentially of:

(1) a liquid organic diluent,
(2) at least one monomer selected from the group consisting of:
    (a) ethylenically unsaturated substituted and unsubstituted hydrocarbons;
    (b) unsubstituted ethylenically unsaturated esters of organic and inorganic acids,
    (c) ethylenically unsaturated organic halides and dihalides, and
    (d) ethylenically unsaturated nitriles,
(3) one monomer selected from the group consisting of:
    (a) a hydroxy lower alkyl ester of an ethylenically unsaturated carboxylic acid,
    (b) an $\alpha,\beta$-ethylenically unsaturated carboxylic acid, and
    (c) a glycidyl compound,
(4) a free radical polymerization catalyst;

(B) Heating said mixture with agitation under liquid phase conditions in an inert atmosphere at a temperature between about 80° F. and about 300° F. until a linear, saturated, ester-free polymer is formed containing polar functionality external to said backbone, said polymer being dispersed in said diluent;

(C) Adding to the dispersion so formed (1) when said backbone contains hydroxyl or oxirane functionality, an $\alpha,\beta$-ethyenically unsaturated carboxylic acid, in an amount sufficient to react with substantially all of the hydroxyl groups, or oxirane groups,
(2) when said backbone contains carboxyl functionality, a hydroxyl substituted, ethylenically unsaturated compound or a glycidyl compound in an amount sufficient to react with the carboxyl groups, and
(3) an esterification catalyst;

(D) Heating the resultant mixture at a temperature and for a time sufficient to form an ester-free backbone containing, through ester linkage, a plurality of external pendant unsaturated groups; and (E) Recovering said copolymer from said diluent.

The term "free radical polymerization catalyst" as used herein is intended to mean and to refer to organic "per" compounds, for example, benzoyl peroxide, methyl ethyl ketone peroxide, tertiary butyl perbenzoate, and the like.

The term "esterification catalyst" as used herein is intended to mean and to refer to catalysts which selectively promote the reaction between hydroxyl or oxirane groups and carboxyl groups. Such catalysts are conventional and are fully disclosed in U.S. Pats. 3,345,339 and 3,355,434, the disclosures of which, as they relate to esterification catalysts, are hereby incorporated by reference.

The reaction mixture is formed by adding the liquid organic diluent to a reaction zone which is maintained in an inert atmosphere by a blanket of inert gas, such as, for example, nitrogen, helium, argon, krypton, and the like, and thereafter adding, with agitation, the monomers and the polymerization catalysts to the liquid diluent. The reaction mixture is maintained at a temperature of between about 80° F. and 300° F. and is continuously agitated during the addition of the monomers of the mixture.

The reaction which results in the formation of the addition polymer or backbone is exothermic. The reaction mixture, after initial heating, is controlled at a temperature within the above range through agitation cooling means or by regulating the rate of addition of the monomers. Although temperatures below 80° F. can be employed, there is usually no advantage and prolonged polymerization times are often required. At temperatures above 300° F., undesirable by-products are sometimes formed. The preferred temperature range will usually depend upon the boiling point of the liquid organic diluent since it has been found preferable to maintain the reaction mixture under reflux during polymerization. It has also been found preferable to conduct the polymerization under liquid rather than vapor phase conditions. Although the latter can be employed, if desired, the process is usually economically disadvantageous. The amount of time required to add the monomers is from about 30 minutes to 3 hours and polymerization times usually require from 8 to 10 hours, depending upon the amount of diluent and the quantity of monomer mixture initially added thereto.

As will be hereinafter evident from the specific examples, the total amount of monomer mixture employed in the formation of the backbone will be from about 5 to about 70 weight percent of polymerized (backbone) solids, the balance comprising liquid organic diluent. The total quantity of monomer mixture employed to form the backbone polymer will depend upon the type of functional pendancy and the procedures employed in attaching the plurality of ethylenically unsaturated groups to the backbone. Where it is intended to add the pendant groups by esterification which involves a condensation reaction, the total solids will be low (e.g., from about 5 to about 10%). Where it is intended to conduct the esterification reaction under anhydrous conditions (e.g., by an addition reaction), the reaction product or mixture will contain from about 25 to about 70%, preferably about 45 to about 65 weight percent of polymerized backbone monomers based on the weight of the reaction mixture.

The amount of free radical polymerization catalyst employed can vary, but is usually a conventional amount (e.g., from about 0.1 to about 1.5%), based on the weight of the reaction mixture.

Completion of the formation of the backbone in the reaction mixture can be readily determined by sampling a portion of the reaction mixture, analyzing it for nonvolatile content, and comparing the percentage with the percentage of monomers in the monomer mixture charged to the reaction zone.

After the linear backbone is formed, ethylenically unsaturated side chains are appended by reacting an appropriate monomer capable of forming an acyl linkage with the pendant functionality external to the backbone. When the backbone contains hydroxyl functionality, an $\alpha,\beta$-ethylenically unsaturated carboxylic acid is added to the reaction mixture (which comprises the saturated substantially ester-free backbone dispersed in the liquid organic diluent) in an amount sufficient to react with substantially all of the hydroxyl groups.

When the backbone contains carboxyl functionality, a hydroxyalkyl ester of an ethylenically unsaturated carboxylic acid is added in an amount sufficient to react with substantially all of the carboxyl groups. The reaction is conducted in the presence of an esterification catalyst hereinbefore referred to.

Due to the high temperatures required in effecting a condensation reaction, the process is preferably carried out under anhydrous conditions and esterification is accomplished by means of an addition reaction. Thus, by way of example, if the backbone contains hydroxyl functionality, it has been found preferable to add a dicarboxylic acid anhydride such as maleic or itaconic anhydride to the reaction mixture in an amount and at a temperature such that one of the carboxyl groups of the half ester will react with the pendant hydroxyl groups. However, where the pendant functionality is oxirane, either a mono- or dicarboxylic acid can be employed.

Where the pendant functionality of the backbone is carboxyl, it has been found preferable, in order to maintain anhydrous conditions, to first add to the reaction mixture an unsaturated compound lower alkylene oxide. Where a lower alkylene oxide is added, saturated hydroxyalkyl groups are pendant from the backbone. Thereafter, these pendant groups can be conventionally reacted with an ethylenically unsaturated dicarboxylic acid anhydride to provide pendant ethylenically unsaturated groups.

Where an unsaturated glycidyl compound is added, esterification takes place and a plurality of unsaturated groups of the glycidyl compound are appended to the backbone.

Although any of a wide variety of catalysts disclosed in U.S. Pat. 3,345,339 or U.S. Pat. 3,355,434 may be employed in effecting the esterification reaction, a catalyst not disclosed in these patents which has been found to be particularly advantageous for use in the process of this invention is lithium carbonate. The amount of such catalyst will depend upon the amount of inert diluent and the concentration of the linear backbone polymer dispersed therein. From about 0.02 to about 2.0 weight percent, basis the weight of the dispersion of any of the esterification catalysts can be employed, the larger amounts corresponding to higher linear polymer concentrations in the dispersion.

Where the esterification reaction is a condensation reaction, the concentration of linear polymer in the diluent will be in the range of from 1 to about 10%. Where the esterification reaction is an addition reaction, the concentration of linear polymer in the diluent can be in the range of from about 5 to about 70% and under these conditions, is preferably from about 45 to about 65 weight percent, basis the weight of the dispersion.

The temperature employed in the esterification reaction will depend upon whether the reaction is a condensation reaction or an addition reaction. Where the esterification reaction involves condensation, the temperature employed will be from about 350° F. to about 420° F. Where the esterification reaction involves an addition reaction, the temperature will be somewhat lower and is advantageous from about 180° F. to about 320° F.

The liquid organic diluent employed can be an inert diluent or a reactive diluent.

The term "reactive diluent" as used herein is intended to mean and to refer to liquid organic diluents which are usually pure and which are esterifiable with the ethylenically unsaturated monomer which is added to the dispersion. For example, where the backbone contains functional hydroxyl or oxirane groups, the reactive diluent will contain hydroxyl or oxirane groups and sufficient dicarboxylic acid anhydride is added to substantially esterify the reactive diluent while esterifying the hydroxyl functionality on the backbone. The polymerization monomer is thus prepared in situ and the resultant dispersion will consist of a copolymer consisting essentially of an ester-free backbone having pendant therefrom through ester linkage a plurality of unsaturated groups polymerizable with vinyl monomer for thermosetting purposes. The dispersion medium is a copolymerizable monomer consisting essentially of the unsaturated carboxylic acid esterified with the alcohol. If desirable, additional copolymerizable vinyl monomer (for example, styrene) can be added to regulate the total solids concentration as desired.

Where the backbone contains functional carboxyl groups, the reactive diluent will be any liquid saturated carboxylic acid such as, for example, butyric or propionic acid and the esterifiable monomer will be an ethylenically unsaturated alcohol, for example, allyl alcohol, crotyl alcohol, or the like. The unsaturated alcohol will esterify with the carboxylic acid and the saturated carboxylic acid to form a composition consisting essentially of a linear polymer composed of a saturated, ester-free backbone having pendant therefrom through ester linkage a plurality of ethylenically unsaturated groups. The linear polymer is dispersed in a copolymerizable monomer consisting of the carboxylic acid ester of the ethylenically unsaturated alcohol.

The employment of the "reactive diluent" is advantageous in that the necessity of stripping the diluent from the polymer is eliminated.

Where an inert liquid diluent is employed, the polymer is recovered from the bulk of the liquid phase of the reaction mixture by stripping (e.g., the vacuum distillation) the diluent from the polymer and recovering the polymer. Because the polymer is highly reactive due to the pendant ethylenically unsaturated groups, it is desirable to add a conventional additional polymerization inhibitor such as, for example, a catechol or a quinone. It is also desirable for purposes of storing the polymer to reduce it in a reactive monomer, usually a copolymerizable monomer containing a $>$C$=$C$<$ group, from which the resultant solution can be directly cured by conventional free radical polymerization to produce thermoset products.

In accordance with one advantageous embodiment of the process of this invention, a reaction mixture containing a hydroxyl-bearing liquid organic solvent such as an alcohol or glycol, a hydroxyalkyl ester of an ethylenically unsaturated carboxylic acid and at least one monomer selected from the group consisting of vinyl aromatic hydrocarbons, ethylenically unsaturated carboxylic acid esters of organic and inorganic acids, ethylenically unsaturated organic halides, and ethylenically unsaturated nitriles is formed by charging the components to a reactor blanketed with an inert gas and heating at a temperature between about 80 and about 300° F. until a linear saturated backbone containing pendant hydroxyl groups is formed and the reaction mixture comprises a saturated linear polymer dispersed in the hydroxyl-bearing liquid "reactive" organic diluent.

Thereafter, an ethylenically unsaturated dicarboxylic acid anhydride (the esterifying monomer) is added to the reaction mixture at a temperature between about 170° F. and about 270° F. in the presence of an esterification catalyst and in an amount sufficient to form the half ester of the liquid organic diluent and the anhydride and to esterify one of the carboxyl groups of the anhydride with the hydroxyl groups pendant from the backbone. The temperature is critical. If a temperature of above about 330° F. is employed, the dicarboxylic acid anhydride will often fully esterify with the hydroxyl groups on the backbone and form a diester with a portion of the hydroxyl groups of hydroxyl-bearing liquid organic diluent. Prior to the addition of the maleic anhydride, an esterification catalyst is added to the reaction mixture.

Thereafter, there is added to the resultant mixture a lower alkylene oxide such as ethylene, propylene, or butylene oxide in an amount sufficient to esterify the unreacted carboxylic acid groups of the half ester comprising an organic liquid diluent and the carboxylic acid groups of the carboxylic acid pendant from the backbone. The resultant reaction mixture consists of a linear saturated, ester-free backbone having pendant therefrom through ester linkage a plurality of hydroxyalkyl ethylenically unsaturated carboxylic acid groups dispersed in a copolymerizable monomer consisting of the monohydroxyalkyl ethylenically unsaturated carboxylic acid and which had been partially esterified with the hydroxyl-bearing liquid organic diluent and subsequently fully esterified with the alkylene oxide. If desirable, the resulting reaction mixture can be cured to form thermoset products. However, for economic reasons, it has often been found desirable to further reduce the polymer product with additional copolymerizable monomer such as, for example, styrene. The foregoing product, when cured, has been found to be particularly resistant to attack by acids, alkalies, and organic solvents.

In accordance with another advantageous embodiment of the process of this invention, an ethylenically unsaturated glycidyl compound (e.g., one of those hereinbefore described) can be employed to form the monomer backbone in place of the hydroxyalkyl ester of an ethylenically unsaturated carboxylic acid. The backbone prior to the formation of the plurality of ethylenically unsaturated groups will then contain oxirane or epoxide functionality which can then be esterified by adding an $\alpha,\beta$-ethylenically unsaturated mono- or dicarboxylic acid. Where a monocarboxylic acid is employed, the addition of the lower alkylene oxide is not required. However, when a dicarboxylic acid is employed, the further addition of lower alkylene oxide is advantageous in that stable products which do not tend to gel on storage are obtained.

In still another advantageous embodiment, the backbone is formed with an $\alpha,\beta$-ethylenically unsaturated carboxylic acid in place of the glycidyl compound or the hydroxyalkyl ester of an ethylenically unsaturated carboxylic acid. The backbone thus formed will contain carboxyl groups pendant therefrom. The liquid organic diluent employed in this process is preferably a carboxylic acid and can be any of those hereinbefore described. The esterification monomer will preferably be an ethylenically unsaturated glycidyl compound, for example, one of the glycidyl compounds hereinbefore described. By so proceeding, a polymer containing ethylenically unsaturated groups pendant from the backbone through ester linkage is formed. The polymer is dispersed in the glycidyl ester of the $\alpha,\beta$-ethylenically unsaturated carboxylic acid employed as the liquid organic diluent.

The following specific examples are intended to illustrate the invention but not to limit the scope thereof, parts and percentages being by weight unless otherwise specified.

Example 1

To a 5 liter reaction vessel equipped with a thermometer, a gas inlet valve, electrical heating coils, mechanical agitator, reflux condenser, and inlet funnels for introducing inert gas and reactants, there was introduced 400 grams of xylene. Into a separate container, there was mixed under a blanket of nitrogen, 35 grams of styrene, 35 grams methyl methacrylate, and 30 grams dihydroxypropyl maleate along with 4 grams of benzoyl peroxide. This mixture was charged into the reactor with continuous agitation over a period of 2 hours while the temperature of the reactor contents was maintained at 285° F. Prior to and during the addition of the mixture to the reactor, gaseous nitrogen was continuously sparged through the reactor and the monomer mix. The contents of the reaction vessel were maintained under continuous agitation and at 285° F. for 10 hours at which time substantially all of the styrene, methyl methacrylate, and dihydroxypropyl maleate mixture had polymerized. The contents of the reaction vessel then consisted of a dispersion of approximately 100 grams of a linear polymer having a saturated ester-free backbone which contained hydroxyl groups pendant from and external to the backbone. A portion of the sample was withdrawn and the average molecular weight as determined by gel phase chromatography was found to be 75,000. The polymer had a hydroxyl number of 119.

The temperature of the contents of the reaction vessel was decreased to 225° F. and thereafter 21 grams of maleic anhydride and a small amount of lithium carbonate were added over a period of about 60 seconds while agitation was continued. Heating and agitation continued for 40 minutes until the maleic anhydride had reacted with the hydroxyl groups of the polymer in the dispersion to form a polymer having pendant mono-maleate groups which contained terminal carboxyl functionality and ethylenic unsaturation. Two hundred grams of the xylene were stripped from the polymer dispersion. One hundred grams of styrene which contained 0.030 weight percent of hydroquinone were added to the polymer dispersion. The remainder of the xylene was stripped providing a liquid polymer composition containing 50% solids in which the solids consisted essentially of the saturated linear polymer backbone having a plurality of ethylenically unsaturated groups which were pendant through ester linkage from the backbone. The linear polymer was dispersed in styrene.

When cured through the addition of 1% benzoyl peroxide, the polymer composition, when poured between glass plates, formed a thermoset film. The film was set aside for further evaluation as described in Example 9. The average molecular weight of the polymer, determined by gel phase chromatography, was found to be 84,000.

Example 2

The procedure of Example 1 was repeated except that prior to the stripping operation, 0.132 gram of lithium carbonate were added to the solution, 12.3 grams of propylene oxide were added to the reaction vessel with agitation while the contents were maintained at a reflux temperature of 260° F. The resulting product was a linear polymer consisting of a saturated ester-free backbone in which there was engrafted through ester linkages of the hydroxyl groups, hydroxypropyl maleate. The polymer was dispersed in xylene which was partially stripped by distillation, in vacuo, until half of the xylene was removed after which 100 grams of styrene containing 0.03% hydroquinone were added to the dispersion and the remainder of the xylene was stripped. The product which was a colorless liquid was cured into a film by the addition of benzoyl peroxide and pouring it between glass plates. The resultant film was set aside for further evaluation as described in Example 9. The average molecular weight of the polymer determined by gel phase chromatography was found to be 90,000.

Example 3

To the reaction vessel described in Example 1, there was added 400 grams of ethylene glycol monoethyl ether.

To a separate container, there was mixed 220 grams of styrene, 60 grams of acrylonitrile, 120 grams of dihydroxypropyl maleate and 4 grams of benzoyl peroxide. This mixture was charged into the reactor over a period of 2 hours under continuous agitation while the contents of the reactor were maintained at 185° F. The contents of the reaction vessel were held under the nitrogen sparge, continuously agitated, and maintained at 185° F. for 10 hours until polymerization had been completed. A portion of the sample was withdrawn and the average molecular weight determined by gel phase chromatography was found to be 85,000. The thermoplastic polymer was a linear saturated ester-free terpolymer having pendant hydroxyl groups.

The temperature of the contents of the reaction vessel was increased to 225° F. and thereafter while the nitrogen sparged and agitation was continued, 518.4 grams of maleic anhydride and a small amount of lithium carbonate were added over a period of about 60 seconds, then 308.4 grams of propylene oxide were added while the contents of the reaction vessel were maintained at a reflux temperature of 250° F. The resulting product was a linear polymer consisting of a saturated ester-free backbone having pendant therefrom through ester linkage with the hydroxyl groups, hydroxypropyl maleate dispersed in ethylene glycol monoethyl ether hydroxypropyl maleate.

The contents of the reaction vessel were increased to 280° F. and 16.3 grams of piperidine, an isomerization catalyst, were added. The contents were agitated and held for 4 hours at this temperature after which the contents of the reaction vessel were cooled to 240° F. and consisted essentially of the linear polymeric backbone on which dependent maleic acid radicals attached through ester linkages had been converted to fumarate radicals.

The reaction mixture was then cooled to 240° F. and 0.34 grams of hydroquinone were dispersed over a 5-minute period with agitation. The resulting polymer solution was then reduced in 696 grams of styrene. The resulting product consisted of a linear thermoplastic polymer having engrafted thereon through ester linkage a plurality of hydroxypropyl fumarate groups. The average molecular weight of the polymer determined by gel phase chromatography was found to be 100,000. A cured film was prepared using the procedure of Example 1 and set aside for evaluation as described in Example 9.

Example 4

The procedure of Example 3 was repeated except that the propylene oxide was added to the fumarate after it had been isomerized with the piperidene. The average molecular weight of the polymer determined by gel phase chromatography was found to be 100,000.

Example 5

The procedure of Example 1 was repeated except that 60 grams of styrene and 40 grams of methyl hydroxypropyl maleate were employed in place of the dihydroxypropyl maleate employed in that example. The resultant polymer was reduced in styrene after stripping of the xylene using the procedure described in Example 1. The resulting polymer was cured with benzoyl peroxide and poured between glass plates, and the resulting thermoset film was set aside for further evaluation as described in Example 9. The average molecular weight of the polymer determined by gel phase chromatography was found to be 85,000.

Example 6

The procedure of Example 3 was repeated except that 100 grams of styrene, 100 grams of methyl methacrylate and 200 grams of dihydroxypropyl maleate were employed in place of the 220 grams of styrene, 60 grams of acrylonitrile, and 20 grams of dihydroxypropyl maleate employed in that example. The resulting product consisted of a linear thermoplastic polymer having engrafted thereon through ester linkage a plurality of hydroxypropyl fumarate groups. The polymer was reduced with styrene to 50% solids and a portion of the polymer poured between glass plates and cured using a free radical polymerization catalyst. The resultant cured film was set aside for further evaluation as described in Example 9. The average molecular weight of the polymer determined by gel phase chromatography was found to be 100,000.

Example 7

To a reaction vessel equipped with a thermometer, a gas inlet valve, electrical heating coils, mechanical agitator, reflux condenser, inlet funnels for introducing inert gas and reactants, there was introduced 400 grams of xylene and 400 grams of butyl acetate. In a separate container, there was mixed under a blanket of nitrogen 35 grams of styrene, 35 grams methyl methacrylate, and 30 grams methacrylic acid along with 4 grams of benzoyl peroxide. The mixture was charged into the reactor with continuous agitation over a period of two hours while the temperature of the reactor contents was maintained at 260° F. During the addition of the mixture to the reactor, gaseous nitrogen was continuously sparged through the reactor and the monomer mixture. The contents of the reaction vessel were maintained under continuous agitation and inert atmosphere at 260° F. at reflux for 10 hours after which time substantially all of the monomers in the mixture had polymerized to form a saturated ester-free linear polymer backbone dispersed in the xylene. The polymerization had been conducted at substantially atmosperic pressure under liquid phase, reflux conditions.

The polymer had a plurality of pendant carboxyl groups. Thereafter, the temperature of the reaction vessel was decreased to 225° F., and 49.6 grams of glycidyl methacrylate were added under continuous agitation over a period of about one minute in the presence of benzyl trimethyl ammonium methoxide. The heating and agitation was continued for 40 minutes until the glycidyl methacrylate had reacted with the pendant carboxyl groups to form a linear polymer having a saturated ester-free backbone and a plurality of ethylenically unsaturated groups linked to the polymer backbone through ester linkage. Half of the xylene was stripped from the polymer and 100 grams of styrene containing hydroquinone were added. The stripping was conducted under vacuum and the remainder of the xylene was removed to provide a polymerizable product containing around 60% solids and consisted of a thermosettable polymeric liquid. A portion of this product was poured between glass plates, mixed with benzoyl peroxide, and permitted to cure into a thermoset film. The film so formed was set aside for further evaluation as described in Example 9. The average molecular weight of the polymer as determined by gel phase chromatography was found to be 65,000.

Example 8

To a reaction vessel of Example 7, there was added 400 grams of xylene. The reactor was blanketed with nitrogen. In a separate container, there was mixed under a blanket of nitrogen, 35 grams of styrene, 35 grams of methyl methacrylate, and 30 grams of glycidyl methacrylate along with 4 grams of benzoyl peroxide. The mixture was charged into the reactor with continuous agitation over a period of two hours and the temperature of the reactor contents was maintained at 285° F. During the addition of the mixture to the reactor, gaseous nitrogen was continuously sparged into the reactor and monomer mixture. The contents of the reaction vessel were maintained under continuous agitation and inert atmosphere at 285° F. for 10 hours after which time substantially all of the monomers had polymerized to form a product comprising a saturated substantially ester-free linear polymer backbone dispersed in xylene and having a plurality of pendant oxirane groups dispersed in the xylene.

Thereafter, the temperature of the reaction vessel was decreased to 225° F., and 18.2 grams of methacrylic acid and a small amount of benzyl trimethyl ammonium methoxide were added with continuous agitation and under a nitrogen blanket to the reaction mixture over a period of about 60 seconds. The heating and agitation was continued for 40 minutes until the methacrylic acid had reacted with the pendant oxirane groups to form a linear polymer having a saturated ester-free backbone and a plurality of pendant ethylenically unsaturated methacrylic groups linked to the polymer backbone through ester linkage and dispersed in xylene. The xylene was stripped from the polymer by vacuum distillation and styrene containing a quinone inhibitor was added to the polymer to provide a thermosettable polymeric liquid containing 50% by weight of the linear polymer described above. A portion of this product was mixed with benzoyl peroxide, poured between glass plates and permitted to cure into a thermoset film which was set aside for further evaluation as described in Example 9. The average molecular weight of the polymer determined by gel phase chromatography was found to be 70,000.

Example 9

The cured films prepared from the polymers of Examples 1 through 8 were tested for chemical resistance and compared with two commercially produced polyester resins. The films were weighed prior to and after immersion in 3.0 N nitric acid, methyl ethyl ketone, and benzene for 24 hours. In every instance, the loss of weight of the films was significantly less than cured commercial polyester films which had been accorded the same treatment.

It will be apparent to those skilled in the art that where the linear saturated, ester-free polymer backbone, prior to the addition of the plurality of ethylenically unsaturated groups, has hydroxyl functionality, the polymers of this invention can be also prepared by reacting ethylenically unsaturated acyl halides with the linear polymer backbone by introducing the ethylenically unsaturated acyl compounds into a dispersion of the polymer in a liquid organic diluent. However, there is usually no advantage to this procedure and difficulties are often encountered in separating the polymer from the acid which is formed as a by-product of the reaction.

Where the plurality of ethylenically unsaturated groups are attached to the polymer backbone via a condensation reaction, care must be taken in order to avoid formation of a gel because of the high temperatures involved in such a condensation reaction. Thus, by way of example, where the polymer backbone, prior to the reaction, contains hydroxyl functionality and an ethylenically unsaturated carboxylic acid is reacted with the hydroxyl groups, it is desirable to use an acid anhydride or a carboxylic acid which will not form a homopolymer.

The phrase "ethylenically unsaturated carboxylic acid" as used herein is intended to mean and to refer to ethylenically unsaturated carboxylic acids and anhydrides thereof.

As will be further evident to those skilled in the art, the novel linear ester-free polymer backbone can be prepared by employing an ethylenically unsaturated alcohol in place of the hydroxy lower alkyl ester of an $\alpha,\beta$-ethylenically unsaturated carboxylic acid to provide a linear backbone having pendant hydroxyl groups from which the plurality of saturated groups can be attached by any of the procedures hereinbefore described.

The thermosettable resin compositions of this invention are conventionally cured under conditions of free radical catalysis. They are useful in making fiberglass reinforced plastic products, and such products usually require less fiberglass. The compositions can be employed to form low density foamed plastic products and such products can be conventionally obtained by curing the compositions in the presence of a blowing agent.

This application contains subject matter related to that contained in five copending patent applications Ser. Nos. 798,349, 798,461, 798,469, 798,470, and 798,769, filed simultaneously with the instant application and assigned to the same assignee.

What is claimed is:

1. A copolymer consisting essentially of an ester-free linear saturated backbone having pendant therefrom, through ester linkage, a plurality of unsaturated groups polymerizable with vinyl monomer for thermo setting purposes, said backbone being the additional polymer of:
    (a) at least one monomer selected from the group consisting of:
        (i) a vinyl aromatic hydrocarbon
        (ii) a lower alkyl ester of an ethylenically unsaturated carboxylic acid
    (b) from about 20 to about 30 weight percent based on the weight of the monomers of a hydroxy alkyl ester of an ethylenically unsaturated carboxylic acid;
said plurality of unsaturated groups consisting essentially of half ester residues of an ethylenically unsaturated dicarboxylic acid.

2. The polymer of claim 1 where the ethylenically unsaturated carboxylic acid residue is the residue of hydroxyalkyl half ester of an ethylenically unsaturated dicarboxylic acid.

3. The polymer of claim 2 where the hydroxyalkyl half ester is monohydroxypropyl fumarate.

4. The polymer of claim 1 where:
    (a) the backbone comprises the addition polymer of:
        (i) from about 70 to about 80 weight percent of a vinyl aromatic hydrocarbon,
        (ii) from about 30 to about 20 weight percent of a hydroxy lower alkyl ester of an unsaturated carboxylic acid, and
    (b) the pendant unsaturated groups are composed of residues of an ethylenically unsaturated carboxylic acid.

5. The polymer of claim 1 where:
    (a) the backbone comprises the addition polymer of:
        (i) from about 50 to about 70 weight percent of a vinyl aromatic hydrocarbon,
        (ii) from about 20 to about 10 weight percent of an unsaturated nitrile, and
        (iii) from about 30 to about 20 weight percent of a hydroxy lower alkyl ester of an ethylenically unsaturated carboxylic acid, and
    (b) the pendant unsaturated groups are composed of residues of an ethylenically unsaturated carboxylic acid.

6. The process of preparing a copolymer consisting essentially of a linear ester-free backbone having pendant therefrom through ester linkage a plurality of unsaturated groups polymerizable with vinyl monomer for thermosetting purposes which comprise the steps of:
    (A) forming a reaction mixture consisting essentially of:
        (1) a liquid organic diluent,
        (2) at least one monomer selected from the group consisting of:
            (a) a vinyl aromatic hydrocarbon,
            (b) a lower alkyl ester of an ethylenically unsaturated carboxylic acid,
            (c) a vinyl halide and
            (d) an ethylenically unsaturated nitrile;
        (3) a hydroxy lower alkyl ester of an ethylenically unsaturated carboxylic acid, and
        (4) a free radical polymerization catalyst;
    (B) heating said mixture with agitation under liquid phase conditions in an inert atmosphere at a temperature and for a time sufficient to form a linear, saturated substantially ester-free polymer containing hydroxyl functionality external to said backbone, said polymer being dispersed in said diluent;
    (C) adding to the dispersion so formed a monomer selected from the group consisting of:
        (1) an ethylenically unsaturated dicarboxylic acid and an anhydride of said ethylenically unsaturated dicarboxylic acid, and
        (2) an esterification catalyst;
    (D) heating the resultant mixture at a temperature and for a time sufficient to form a linear copolymer having a substantially inert backbone and containing pendant ethylenically unsaturated groups.

7. The process of claim 6 wherein said liquid organic diluent is an inert diluent and where in step (C)–(1), the $\alpha,\beta$-ethylenically unsaturated carboxylic acid acid is a dicarboxylic acid anhydride.

8. The polymer of claim 1 having an average molecular weight between about 6,000 and about 225,000.

9. The process of claim 6 wherein said copolymer is recovered from said diluent.

References Cited

UNITED STATES PATENTS

| | | | |
|---|---|---|---|
| 3,247,145 | 4/1966 | Masters et al. | 260—23 |
| 3,366,706 | 1/1968 | Vasta | 260—834 |
| 3,418,295 | 12/1968 | Schoenthaler | 260—80.72 |
| 3,428,588 | 2/1969 | Skoultchi et al. | 260—23 |
| 3,448,089 | 6/1969 | Celeste | 260—78.5 |
| 3,471,457 | 10/1969 | Vasta | 260—78.5 |

JOSEPH L. SCHOFER, Primary Examiner

J. KIGHT, III, Assistant Examiner

U.S. Cl. X.R.

260—78.5, 80.75, 80.78, 80.8, 80.81, 861, 872, 873